(No Model.)

C. W. JOHNSON.
KITCHEN CABINET.

No. 344,909. Patented July 6, 1886.

Witnesses.
A. Ruppert.
F. S. Pandy

Inventor.
C. W. Johnson.
Per
Thomas P. Simpson.
Attorneys.

UNITED STATES PATENT OFFICE.

CHARLES W. JOHNSON, OF LOVINGTON, ILLINOIS.

KITCHEN-CABINET.

SPECIFICATION forming part of Letters Patent No. 344,909, dated July 6, 1886.

Application filed June 1, 1885. Serial No. 167,308. (No model.)

*To all whom it may concern:*

Be it known that I, CHARLES W. JOHNSON, of Lovington, in the county of Moultrie and State of Illinois, have invented an Improved Kitchen-Cabinet, of which the following is a specification.

The invention relates to kitchen-cabinets for containing flour, meal, salt, and other condiments, and such implements as are usually employed in the making up and preparation of dough before it is cooked.

The special object of my invention is to arrange the kneading-board, the compartments, the hinged cover, and the trap-door, so that when a lady or cook is ready to make up her bread and steps to the front of the cabinet for that purpose everything needed may be within convenient reach of her hands without leaving her position in front of the cabinet.

Figure 1:
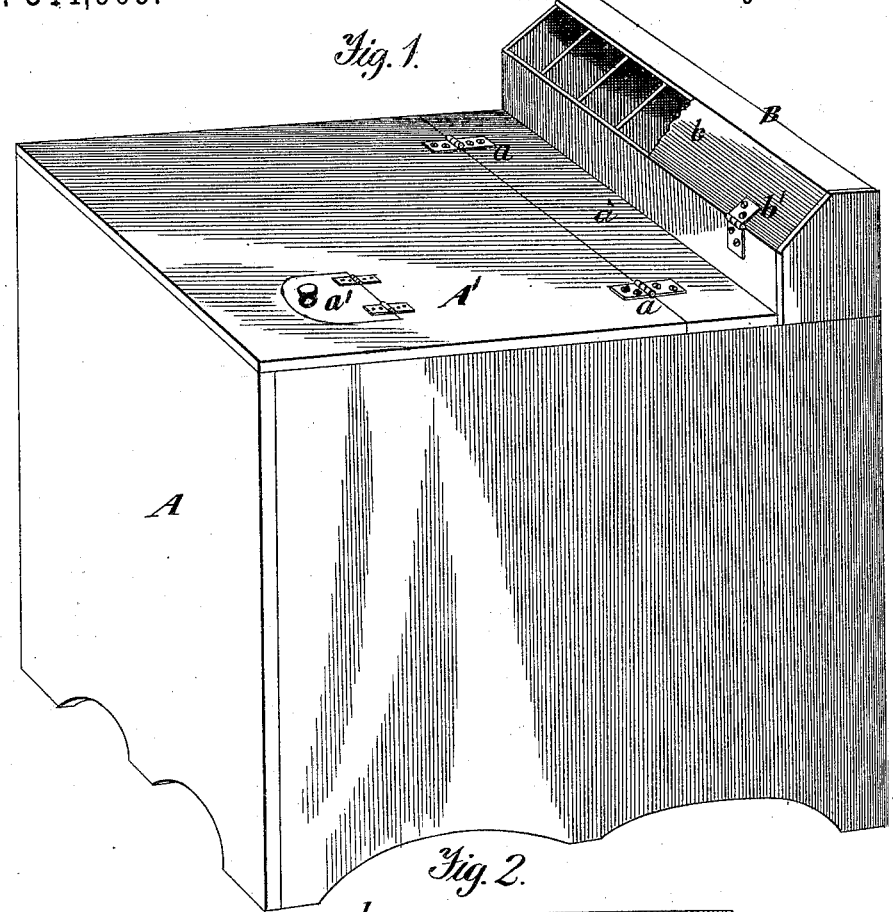
Figure 2:
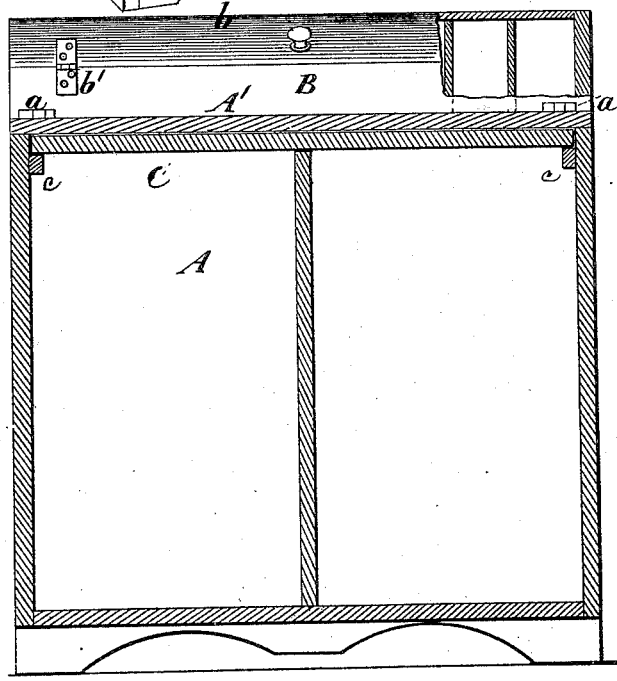

Figure 1 of the drawings is an elevation in perspective, and Fig. 2 a transverse vertical section to show partition and side strips.

In the drawings, A represents the body of cabinet, made preferably about two feet and a half in height and in breadth, the distance from front to rear being about two feet.

$A'$ is a top cover, hinged at $a\ a$ so as to leave the rest $a^2$ on which to place the rolling-pin and the vessel containing the water or milk, while beyond this is arranged a compartment, B, subdivided so as to hold the rolling-pin, a measuring-vessel, salt, and other condiments under cover.

$b$ is a hinged lid that closes by gravity, the same being hinged at $b'$.

C is the kneading-board, supported loosely under the cover $A'$, so as to be easily reached as soon as the cover $A'$ is lifted. In order to support it, I make the parallel side strips, $c\ c$, fast to the sides of body A and directly under the cover, which is sustained upon the top edges of the body.

$a'$ is the trap-door in the cover $A'$. The mode of using it is as follows: The lady or cook takes her vessel of water, milk, or buttermilk with which she expects to make up her dough, proceeds to the front of cabinet and places it upon the space $a^2$, gets her rolling-pin out of the compartment B, and places it upon the space $a^2$; then lifts the cover $A'$, takes out the kneading-board C, and places it to the left of the trap-door $a'$ on cover $A'$. Now, she lifts the trap-door $a'$, and with a flour scoop or cup secures the desired quantity of flour, emptying it upon her kneading-board C. She now mixes it with liquid until the dough is of the right consistency. Then she again lifts the trap-door $a'$, and with her hand secures a little flour to sprinkle her board, then rolls the dough out with her rolling-pin, and, finally, gets the necessary salt from compartment B and mixes this with the dough. This completes the whole operation without moving from her position before the cabinet.

Having thus described all that is necessary to a full understanding of my invention, what I claim as new, and desire to protect by Letters Patent, is—

A kitchen-cabinet having the hollow body A, to receive flour, the cover $A'$ on top, but hinged at $a\ a$, and having trap-door $a'$ at one side, the rest or space $a^2$ in front of the door, the compartment B in front of rest $a^2$, and the side strips, $c\ c$, directly under the door and supporting the kneading-board, all arranged with relation to the front of the cabinet so that the bread-maker can reach whatever she wishes without leaving said front, in the manner described.

CHARLES W. JOHNSON.

Witnesses:
H. M. MINOR,
RICHARD E. SELBY.